(12) United States Patent
Zhao et al.

(10) Patent No.: US 9,126,134 B2
(45) Date of Patent: Sep. 8, 2015

(54) EXHAUST GAS SEPARATING TOWER AND EXHAUST GAS SEPARATING AND RECYCLING SYSTEM

(71) Applicant: Tianhua Institute of Chemical Machinery and Automation Co., Ltd, Lanzhou, Gansu Province (CN)

(72) Inventors: Xu Zhao, Lanzhou (CN); Yonggong Ling, Lanzhou (CN); Yan Dou, Lanzhou (CN); Tao Shen, Lanzhou (CN); Zhongfu Zhan, Lanzhou (CN); Yongpeng Tan, Lanzhou (CN); Yan Zhang, Lanzhou (CN)

(73) Assignee: TIANHUA INSTITUTE OF CHEMICAL MACHINERY AND AUTOMATION CO., LTD., Lanzhou, Gansu Province (CN)

( * ) Notice: Subject to any disclaimer, the term of this patent is extended or adjusted under 35 U.S.C. 154(b) by 191 days.

(21) Appl. No.: 14/018,207

(22) Filed: Sep. 4, 2013

(65) Prior Publication Data

US 2014/0060333 A1    Mar. 6, 2014

(30) Foreign Application Priority Data

Sep. 4, 2012    (CN) .......................... 2012 1 0323017

(51) Int. Cl.
*B01D 47/06* (2006.01)
*B01F 3/04* (2006.01)
*B01D 47/05* (2006.01)
*B01D 47/14* (2006.01)

(52) U.S. Cl.
CPC ................ *B01D 47/05* (2013.01); *B01D 47/06* (2013.01); *B01D 47/14* (2013.01); *B01F 3/04021* (2013.01); *B01F 3/04078* (2013.01); *B01F 3/04468* (2013.01); *B01F 3/04496* (2013.01); *B01D 2247/107* (2013.01); *B01D 2247/14* (2013.01)

(58) Field of Classification Search
CPC .......... B01D 47/06; B01D 47/14; B01F 3/04; B01F 3/04021; B01F 3/04078; B01F 3/04468; B01F 3/04496
USPC ........................................... 96/243, 290, 296
See application file for complete search history.

(56) References Cited

U.S. PATENT DOCUMENTS 2,162,838 A * 6/1939 Cole et al. ...................... 423/234

* cited by examiner

*Primary Examiner* — Robert A Hopkins
(74) *Attorney, Agent, or Firm* — Workman Nydegger (57) ABSTRACT

The invention relates to an exhaust gas separating tower, comprising a washing section, a flash-distilling section above the washing section, and a liquid seal means between the flash flash-distilling section and the washing section. The washing section is configured for washing exhaust gas entering the tower with a cooling liquid to at least partially remove solid dust entrained in the exhaust gas, cool the exhaust gas, and condense at least a portion of moisture in the exhaust gas into liquid. The flash-distilling section is configured for flash-distilling the cooling liquid from the washing section to produce a cooled cooling liquid and a cooling liquid vapor. The liquid seal means is configured so that the cooling liquid produced by flash-distillation can enter the washing section through the liquid seal means while the flash-distilling section is in gas-phase isolation from the washing section, wherein a pressure in the flash-distilling section is lower than that in the washing section.

20 Claims, 6 Drawing Sheets

Prior Art

EXHAUST GAS SEPARATING TOWER AND EXHAUST GAS SEPARATING AND RECYCLING SYSTEM

CROSS-REFERENCE TO RELATED APPLICATIONS

The present application claims the priority of Chinese Patent Application No. 201210323017.1 filed on Sep. 4, 2012 and entitled "EXHAUST GAS SEPARATING TOWER", the entirety of which is incorporated herein by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the present invention described herein. All references listed, cited and/or discussed in this specification are incorporated herein by reference in their entireties and to the same extent as if each reference was individually incorporated by reference.

FIELD OF THE INVENTION

The present invention relates to an exhaust gas separating tower, and particularly to a separating tower for separating moisture vapors in the exhaust gas from non-condensable gas in the exhaust gas. The present invention also relates to an exhaust gas separating and recycling system for separating the moisture vapors in the exhaust gas from the non-condensable gas in the exhaust gas and recycling the separated moisture vapors.

BACKGROUND OF THE INVENTION

A large quantity of exhaust gas may be produced during industrial processes such as drying and/or pyrolysis processes. The exhaust gas contains not only non-condensable process gases such as air or the like, but also a large amount of moistures including inorganic moistures such as water vapor, or organic moistures such as hexane, methanol, ethanol, and/or acetic acid, and a small amount of solid dust. It is a conventional technique to dehumidify the moisture-containing exhaust gas with a separating tower, such as a washing and cooling tower, to remove the moisture from said exhaust gas, which has been applied widely in process industries, such chemical industry (e.g., petrochemical industry, coal chemical industry, etc.), steel industry, metallurgy industries or the like.

Figure 1:
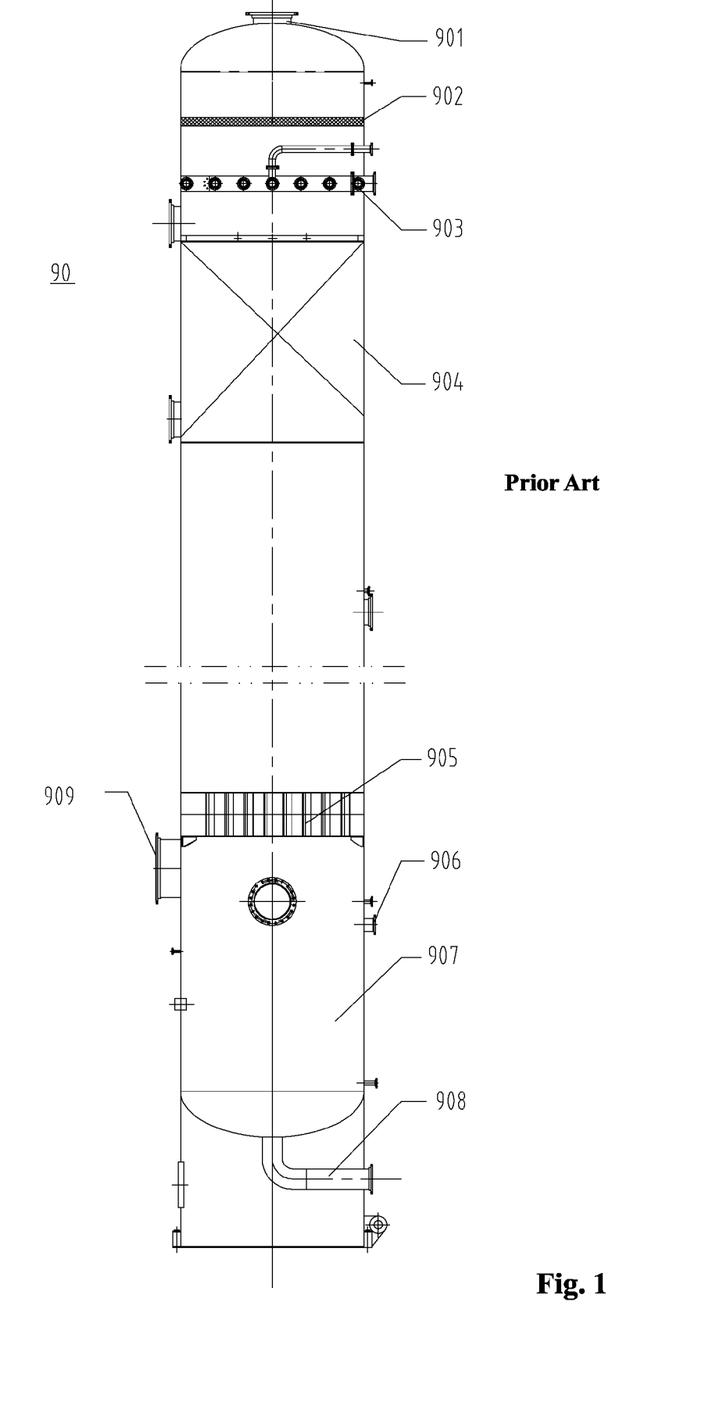
FIG. 1 is a structural diagram for an existing washing and cooling tower.

FIG. 1 shows a conventional washing and cooling tower 90, which comprises from top to bottom: a gas outlet 901, a gas demister 902, a liquid dispenser 903, a filling unit 904 filled with one or more layers of fillers, a gas inlet dispenser 905, a liquid overflow discharge device 906 and a liquid storage region 907 at a lower part of the tower, and a liquid outlet 908 at the bottom of the tower.

Figure 2:
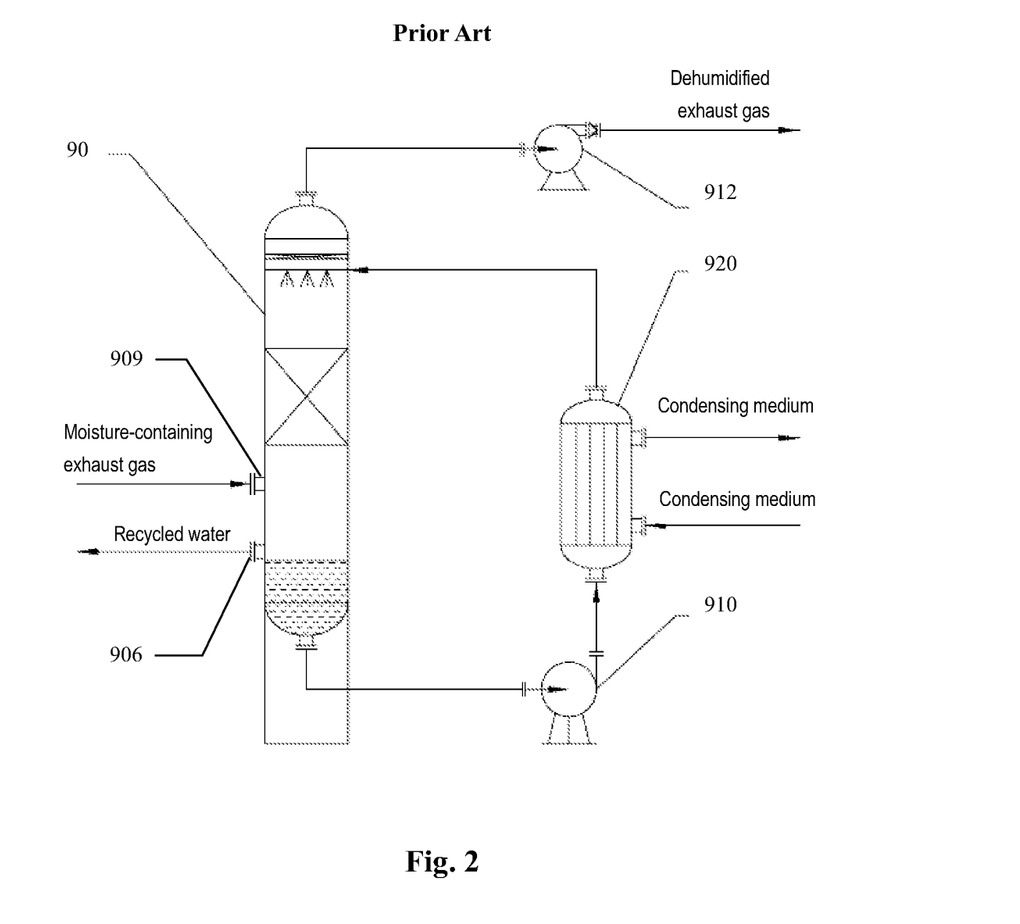
FIG. 2 is a flow diagram illustrating dehumidifying processes by using a washing and cooling tower in the prior art.

As shown in FIG. 2, a moisture-containing exhaust gas for example from the drying process enters the washing and cooling tower 90 via a gas inlet 909 adjacent to the bottom of the tower, and rises up to the filling unit 904. A circulating cooling liquid condensed from the moisture enters the tower from its top, and is evenly sprayed onto the surface of the underlying filler layer through the liquid dispenser 903. In the filler layer, heat exchange and mass exchange proceed between the exhaust gas and the cooling liquid, which contact with each other in a counter-flowing manner. During this process, the exhaust gas is cooled by the cooling liquid, so that at least a portion of moisture in the exhaust gas is condensed into liquid and becomes a portion of the cooling liquid; while the exhaust gas is washed by the cooling liquid, so that the solid dust in the exhaust gas is at least partially and preferably totally removed therefrom. After passing through the filling unit 904, the exhaust gas rises in the tower and reaches the demister 902, where the exhaust gas is demisted. The demisted exhaust gas is discharged from the washing and cooling tower 90 via the gas outlet 901 by means of an induced draft fan 912. During the above-mentioned exchanging process, the cooling liquid is heated by the exhaust gas. The cooling liquid that leaves the filler layer falls to reach the bottom of the tower. A portion of the cooling liquid is discharged from the tower 90 through the overflow discharge device 906 at the bottom of the tower or a circulating cooling liquid pump 910 at the outside of the tower, and becomes a recycled moisture liquid that consists of the moisture and the dust. The remaining cooling liquid in the tower is discharged therefrom by the circulating liquid pump 910 via the liquid outlet 908, and fed into a cooling device 920 by the pump 910 for cooling. The cooled cooling liquid is fed again into the washing and cooling tower 90 to repeat the above processes.

However, such cooling tower in the prior art suffers from the following drawbacks. The recycled moisture liquid obtained from the washing and cooling tower contains not only the liquid condensed from moisture in the exhaust gas, but also solid dust entrained in the exhaust gas. Thus, a further liquid-solid separation process is required to be performed on the recycled liquid, which is technically complex and costly. Furthermore, the dust in the moisture-containing exhaust gas may also enters the circulating cooling liquid, which may block the cooling device during the cooling process for the cooling liquid, and lower the heat exchanging efficiency. Moreover, in order to perform the washing, cooling, and recycling possess, many other apparatuses or devices are needed expect for the conventional washing and cooling tower 90, so that a large work area is required.

SUMMARY OF THE INVENTION

It is an objective of the invention to provide an exhaust gas separating tower to at least partially overcome or alleviate the drawbacks in the prior art as mentioned above.

It is another objective of the invention to provide an exhaust gas separating and recycling system to at least partially overcome or alleviate drawbacks in the prior art as mentioned above.

To this end, according to one aspect of the invention, an exhaust gas separating tower is provided, which comprises a washing section, a flash-distilling section arranged above the washing section, and a liquid seal means arranged between the flash-distilling section and the washing section. The washing section is configured for washing an exhaust gas entering the tower with a cooling liquid so as to at least partially remove solid dust entrained in the exhaust gas, cool the exhaust gas, and condense at least a portion of moisture in the exhaust gas into liquid. The washing section comprises an exhaust gas inlet, an exhaust gas outlet arranged above the exhaust gas inlet, and a cooling liquid outlet for discharging the cooling liquid having washed the exhaust gas. The flash-distilling section is configured for flash-distilling the cooling liquid from the washing section to produce a cooled cooling liquid to be provided to the washing section and a cooling liquid vapor. The flash-distilling section comprises a cooling liquid inlet through which the cooling liquid from the washing section enters the flash-distilling section, a flash-distilling space for performing flash-distillation therein, and a vapor outlet through which the cooling liquid vapor is discharged. The liquid seal means is configured so that the cooled cooling liquid produced by flash-distillation is able to enter the washing section through the liquid seal means while the flash-distilling section is in gas-phase isolation from the washing section, wherein a pressure in the flash-distilling section is lower than that in the washing section.

According to another aspect of the present invention, an exhaust gas separating and recycling system is provided. The system comprises the exhaust gas separating tower according to the invention as described above. The system further comprises a pump connected between the cooling liquid outlet of the washing section and the cooling liquid inlet of the flash-distilling section, for delivering the cooling liquid that has washed the exhaust gas from the washing section into the flash-distilling section for flash-distillation.

With the exhaust gas separating tower of the invention, moistures in the exhaust gas joins the circulating cooling liquid, and is discharged from the tower in form of cooling liquid vapor via the vapor outlet of the flash-distilling section. The non-condensable gas in the exhaust gas, along with the exhaust gas, is discharged from the tower via the exhaust gas outlet of the washing section. In this way, the moisture vapors and the non-condensable process gas in the exhaust gas can be separated.

With the exhaust gas separating tower of the invention, a clean moisture vapor can be obtained by flash-distillation under a negative pressure. Therefore, a clean recycled liquid can be obtained by condensing said vapor. Thus, the drawback that the recycled liquid from the conventional washing-cooling-absorbing tower contains impurities is avoided. Since the moisture vapor produced by flash-distillation under negative pressure according to the invention is a clean vapor, said vapor will not block other devices such as a condensing heat exchanger. In the separating tower of the invention, the heat for flash-distilling the cooling liquid is from the exhaust gas entering the tower, so that no heat supplement is required for the tower. According to the invention, conventional devices for washing, cooling, absorbing, and flash-distilling are integrated into one tower that requires only small work area.

BRIEF DESCRIPTION OF THE DRAWINGS

Reference will now be made in detail to embodiments of the present invention, examples of which are illustrated in the accompanying drawings, wherein.

DETAILED DESCRIPTION OF THE PREFERRED EMBODIMENT

The invention will now be described in details through following illustrative embodiments. However, it should be understood that an element, a structure or a feature in an embodiment can be beneficially incorporated into other embodiments without further recitation.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the present invention described herein. All references listed, cited and/or discussed in this specification are incorporated herein by reference in their entireties and to the same extent as if each reference was individually incorporated by reference.

It should also be understood that "comprises/comprising" when used in the specification is taken to specify the presence of stated features, integers, steps or components but dose not preclude the presence or addition of one or more other features, integers, steps or components or groups thereof.

Figure 3:
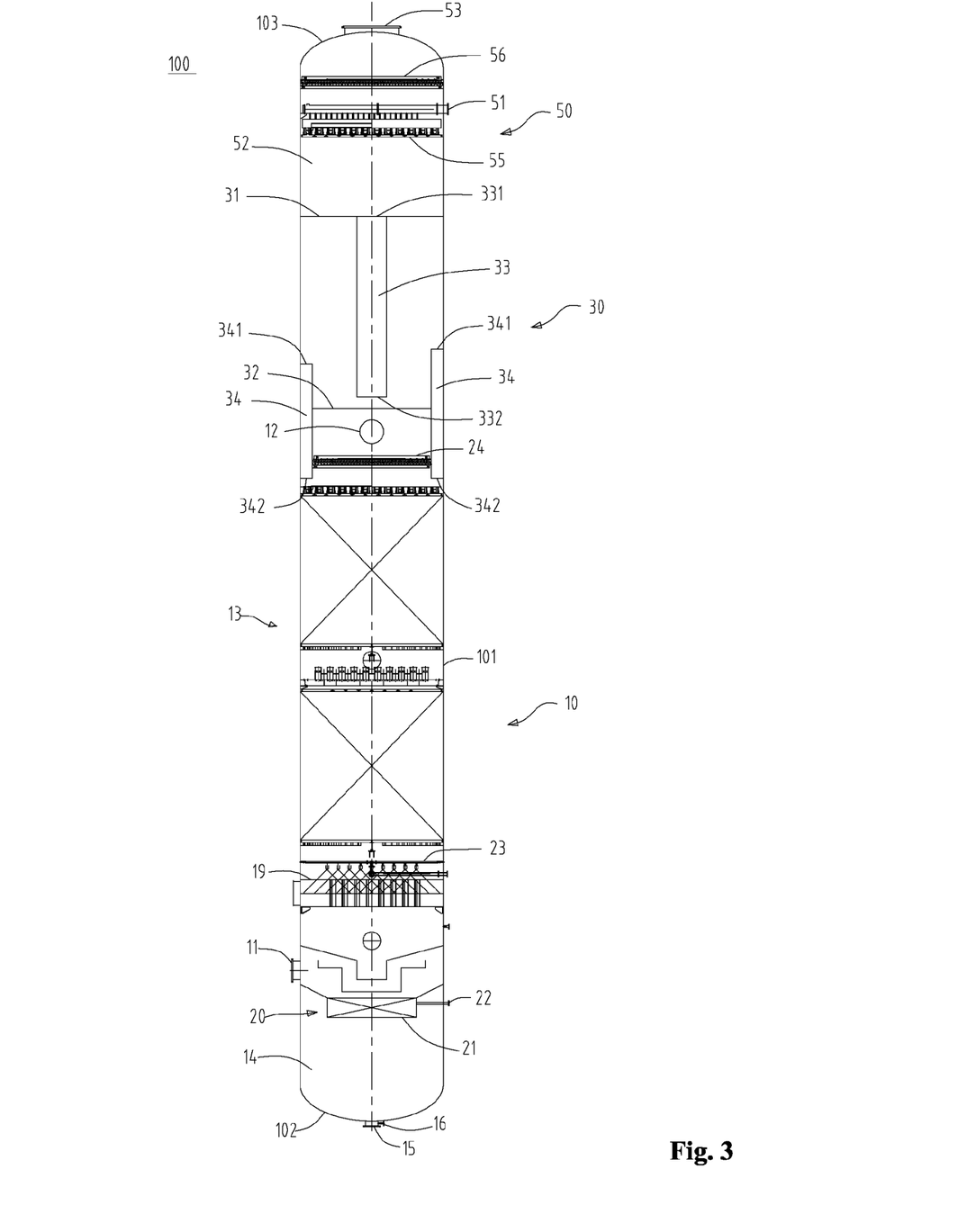
FIG. 3 is a structural diagram for a separating tower according to an embodiment of the invention.

FIG. 3 illustrates an exhaust gas separating tower 100 according to an embodiment of the invention, which comprises a washing section 10 at a lower part of the tower and a flash-distilling section 50 at an upper part of the tower.

Exhaust gas carrying moistures (e.g. water vapor) and solid dust enters the washing section 10 via an exhaust gas inlet 11. In the washing section 10, exhaust gas entering the tower is washed by a circulating cooling liquid (e.g. water) to at least partially and preferably totally remove the solid dust in the exhaust gas, lower the temperature of the exhaust gas, and condense at least a portion of the moisture in the exhaust gas into liquid. The condensed moisture liquid becomes a portion of the cooling liquid. The exhaust gas that has been washed is discharged out of the tower via an exhaust gas outlet 12. The exhaust gas inlet 11 and outlet 12 can be arranged in a sidewall 101 of the tower, wherein the exhaust gas outlet 12 is positioned higher than the exhaust gas inlet 11. The cooling liquid that has washed the exhaust gas is accumulated at the bottom of the washing section 10, and can be discharged from the washing section 10 via a cooling liquid outlet 15.

The flash-distilling section 50 is configured for receiving and flash-distilling the cooling liquid that has been used in the washing section 10, so as to produce a cooled cooling liquid and a cooling liquid vapor. The cooling liquid from the cooling liquid outlet 15 of the washing section 10 enters the flash-distilling section 50 via its cooling liquid inlet 51, and is subject to flash-distillation in a flash-distilling space 52 of the flash-distilling section. The cooling liquid vapor produced from flash-distillation can be discharged out of the tower via a vapor outlet 53 of the flash-distilling section. The discharged vapor can be condensed into liquid by a condensing device outside the tower, and the condensed liquid can be recovered and recycled. According to an example of the invention, the cooling liquid inlet 51 can be arranged in the sidewall 101 of the tower and above the flash-distilling space 52. The vapor outlet 53 can be arranged at the top 103 of the tower.

A liquid seal means 30 is arranged between the flash-distilling section 50 and the washing section 10. The liquid seal means 30 is configured so that the cooling liquid produced by flash-distillation can enter the washing section 10 via the liquid seal means 30 while the flash-distilling section 50 is in gas-phase isolation from the washing section 10. In this way, the washing section 10 and the flash-distilling section 50 can be configured to have different internal pressure. Advantageously, the pressure in the flash-distilling section 50 is lower than the pressure in the washing section 10. Due to such pressure difference, the cooling liquid heated by the exhaust gas in the washing section 10 can be flash-distilled rapidly upon reaching the flash-distilling section 50. Preferably, the operating pressure in the washing section 10 is set to an atmospheric pressure or a slight positive pressure, while the operating pressure of the flash-distilling section 50 is set to a negative pressure of about 2.5 kPa(A) to about 32 kPa(A).

Figure 4:
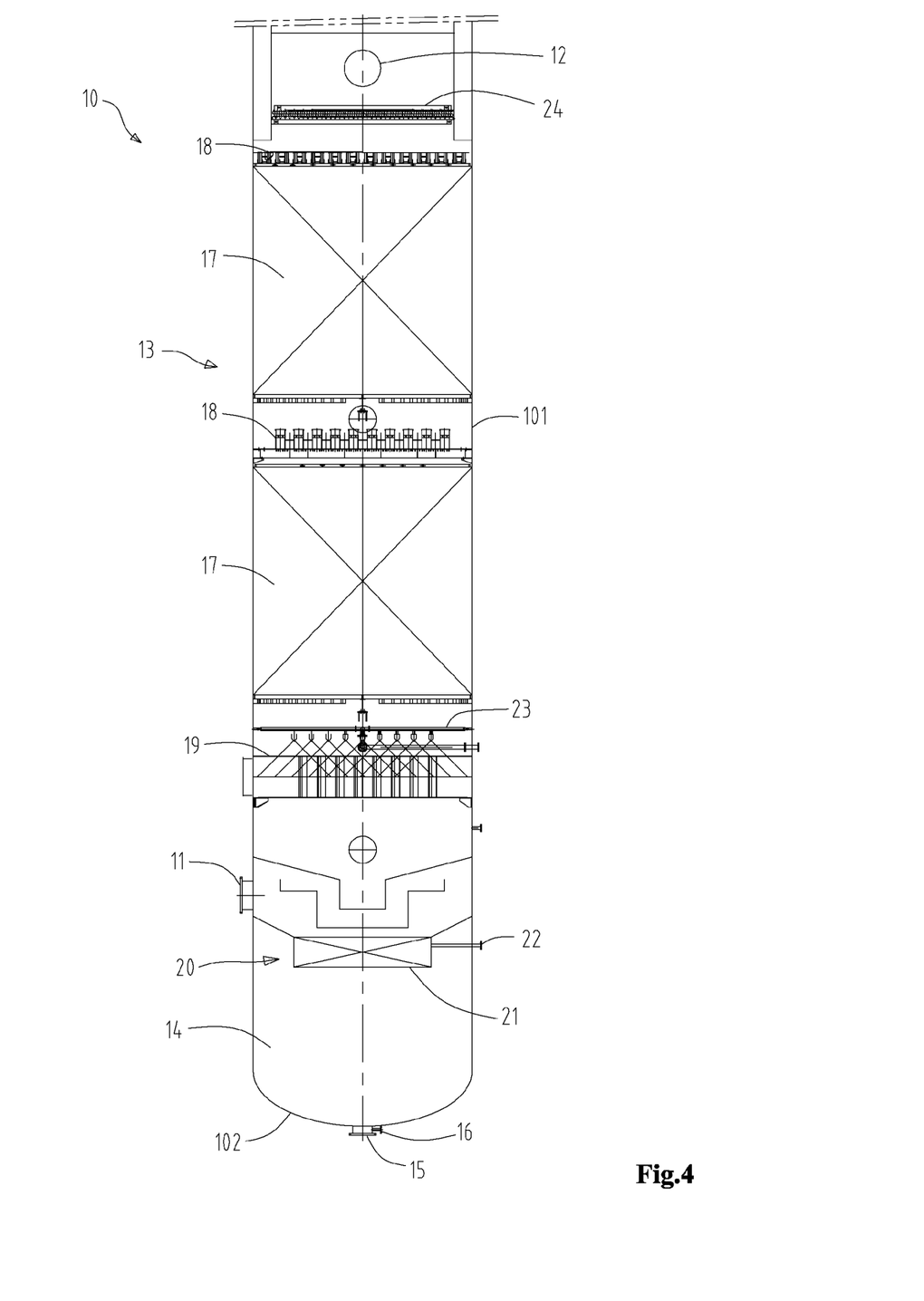
FIG. 4 is an enlarged schematic view showing a washing section of the separating tower in FIG. 3.
Figure 6:
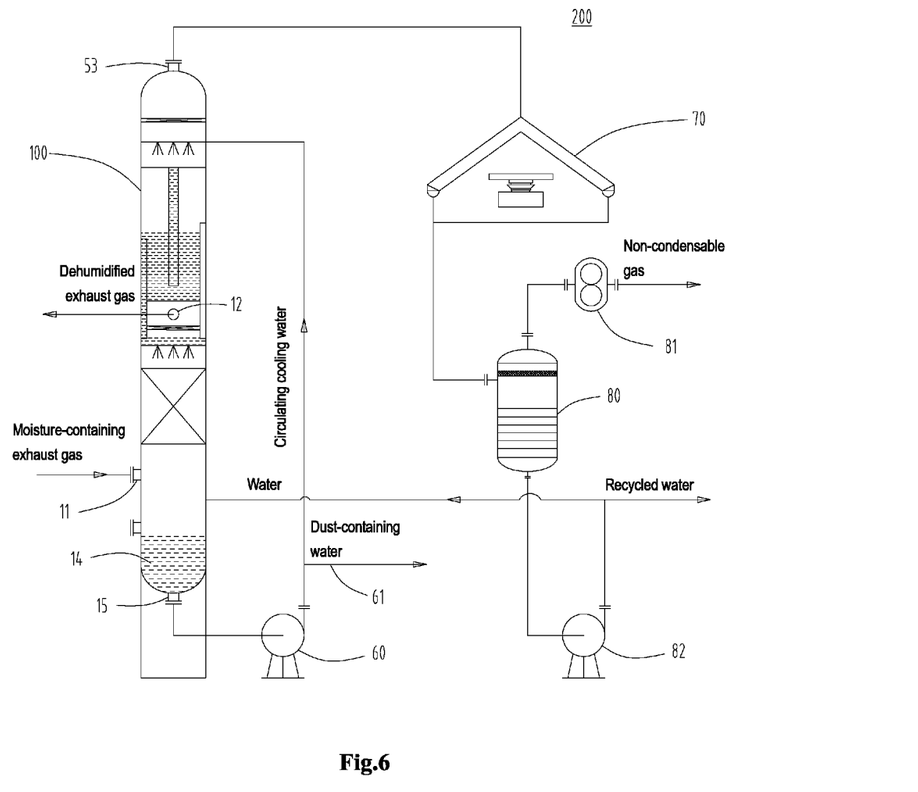
FIG. 6 is a schematic view showing an exhaust gas separating and recycling system according to an embodiment of the invention.

As shown in FIG. 4, according to an embodiment of the invention, the washing section 10 comprises a filler segment 13 arranged within the tower, a liquid storage segment 14 at the bottom of the tower 100, and a cooling liquid outlet 15 extending from a bottom wall 102 of the tower. The filler segment 13 is arranged in a vertical direction between the exhaust gas inlet 11 and the exhaust gas outlet 12, so that the cooling liquid from the flash-distilling section 50 and the exhaust gas input from the exhaust gas inlet 11 contact with each other in a counter-flowing manner in the filler segment 13. During such counter-flowing contact, the exhaust gas is cooled by the cooling liquid so that at least a portion of the moistures in the exhaust gas is condensed into liquid and becomes a portion of the cooling liquid, and at the same time at least a portion of solid dust in the exhaust gas is removed from the exhaust gas by washing with the cooling liquid. The liquid storage segment 14 is arranged for storing the cooling liquid falling from the filler segment 13. The stored cooling liquid can be discharged from the washing section via the cooling liquid outlet 15, and can further be delivered into the flash-distilling section 50 for example by a pump 60 arranged outside the tower (FIG. 6). The liquid storage segment 14 can be provided with a liquid discharge means with liquid seal and/or a port with high/low liquid level detector.

The cooling liquid in the liquid storage segment 14 contains fixed dust which is removed from the exhaust gas. According to an embodiment of the invention, a quantitative discharging port 16 branches from the cooling liquid outlet 15, for quantitatively discharging the cooling liquid stored in the liquid storage segment 14 to maintain the solid dust content in the separating tower 100 within a predetermined range.

According to an embodiment of the invention, the filler segment 13 comprises at least one filling unit 17 with one or more layers of fillers and at least one liquid dispenser 18, wherein above each filling unit 17 there is one liquid dispenser 18. The arrangement of the filling unit 17 is arranged for increasing the contact time and contact area between the exhaust gas and the cooling liquid, so that the exhaust gas can be better washed and cooled. The liquid dispenser 18 is arranged for allowing the cooling liquid to evenly fall onto the corresponding filling unit 17. Two filling units 17 and two liquid dispensers 18 are shown in FIG. 4 for example. Each layer of filler in the filling unit 17 can be for example selected from a bulk filler, a regular filler, a general sieve plate, an oriented sieve plate, and/or a multiple-downspout sieve plate. The liquid dispenser 18 can be for example a conventional liquid distributor for a tower, a mesh-disc-type distributor, a detachable-slot-plate-type gas/liquid distributor, or an overflow-disc-type liquid distributor.

According to an embodiment of the invention, an exhaust gas dispenser 19 is arranged below the filler segment 13, through which the exhaust gas input from the exhaust gas inlet 11 can be evenly provided to the filler segment 13. According to an embodiment of the invention, a spraying segment is arranged between the filler segment 13 and the exhaust gas dispenser 19, for pre-cooling and pre-washing the exhaust gas before it reaches the filler segment 13. The spraying segment comprises one or more liquid sprayers 23, which can be conventional sprayers produced by Spraying Systems Co. The liquid used in the sprayer 23 can be the cooling liquid falling from above or provided from the outside of the tower.

Non-condensable gas such as oxygen, and/or nitrogen in the air or like, which is contained in the exhaust gas and is not condensable, may be dissolved in the cooling liquid falling from the filler segment 13. The presence of such non-condensable gas will increase the quantity of the non-condensable gas precipitated during the subsequent flash-distillation of the cooling liquid. According to an embodiment of the invention, a non-condensable gas removing segment 20 is arranged between the filler segment 13 and the liquid storage segment 14. The non-condensable gas removing segment 20 comprises a filler layer 21 and a vapor inlet pipe 22 extending from the sidewall 101 of the tower to the filler layer 21. Thus, vapor with high temperature can enter the filler layer 21 via the vapor inlet pipe 22, heating the cooling liquid passing through the filler layer 21. In this way, the non-condensable gas decreases in dissolvability and thus volatilizes from the cooling liquid. Thus, the quantity of non-condensable gas in the cooling liquid entering the flash-distilling section 50 can be minimized The filler in the filler layer 21 can be a bulk filler such as a Pall ring, a ladder ring, or a modified Pall ring, which is made from metal or plastics material; or a regular filler such as a wave mesh filler, or a corrugated filler; or any combination of the foregoing fillers. The vapor with high temperature fed via the vapor inlet pipe 22 can be provided by an external vapor source (not shown).

According to an embodiment of the invention, a gas demister 24 is arranged between the filler segment 13 and the exhaust gas outlet 12, for removing mist droplets entrained in the exhaust gas before the exhaust gas is discharged from the exhaust gas outlet 12, so as to further increase the dryness of the discharged exhaust gas. According to the invention, the demister 24 can be a conventional demister, such as a filler-type demister, a screen-type demister, a baffle-plate-type demister, or the like.

Figure 5:
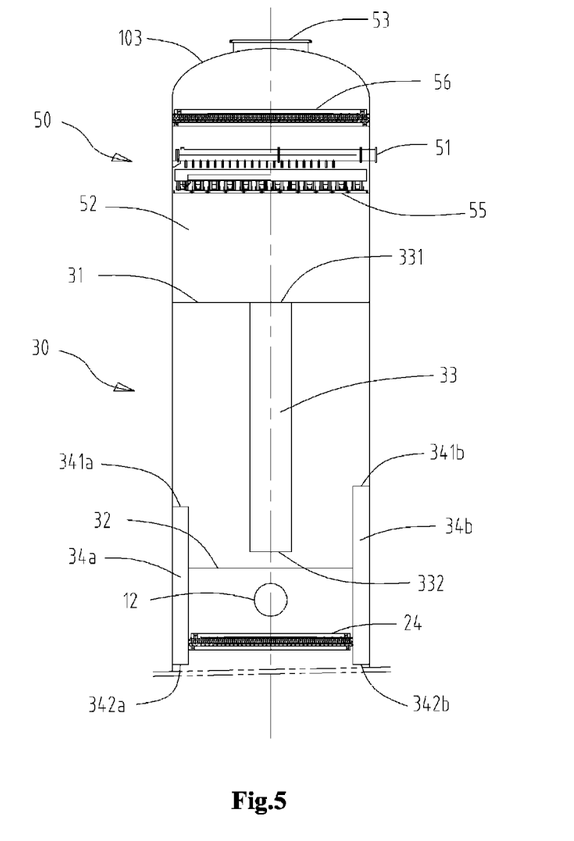
FIG. 5 is an enlarged schematic view showing a flash-distilling section and a liquid seal means of the separating tower in FIG. 3.

Reference is made to FIG. 5, which shows an enlarged schematic view of the flash-distilling section 50 of the separating tower according to an embodiment of the invention. A cooling liquid dispenser 55 is arranged in the flash-distilling section 50, which is below the cooling liquid inlet 51 and above the flash-distilling space 52, so that the cooling liquid from the inlet 51 can be evenly distributed into the underlying flash-distilling space 52. The cooling liquid dispenser 55 can be for example a conventional liquid distributor for a tower, a mesh-disc-type distributor, a detachable-slot-plate-type gas/liquid distributor, or an overflow-disc-type liquid distributor.

According to an embodiment of the invention, the flash-distilling section 50 is further provided with a demister 56, for removing the mist droplets in the cooling liquid vapor produced by flash-distillation before said cooling liquid vapor is discharged from the flash-distilling section 50. The demister 56 is arranged in the top portion of the flash-distilling section 50, above the cooling liquid inlet 51 and below the vapor outlet 53. The demister 56 may be a conventional demister, such as a filler-type demister, a screen-type demister, a baffle-plate-type demister, or the like.

Referring to FIG. 5 again, according to an embodiment of the invention, the liquid seal means 30 comprises an upper partition plate 31 and a lower partition plate 32 which are separated from each other. The upper partition plate 31 is arranged at the bottom of the flash-distilling section 50, while the lower partition plate 32 is arranged at the top of the washing section 10. At least one first downspout 33 extends downwards from the upper partition plate 31. The first downspout 33 has a top opening 331 in the upper partition plate 31, so as to communicate with the flash-distilling section 50. The first downspout 33 has a bottom opening 332 close to and spaced apart from the lower partition plate 32 by a distance. In this manner, the cooling liquid from the flash-distilling section 50 can flow to the lower partition plate 32 through the first downspout 33. At least one second downspout 34 extends through the lower partition plate 32, and has a top opening 341 at a position higher than the bottom opening 332 of the first downspout 33. Thus, the liquid in the lower partition plate 32 can be accumulated to a height equal to or larger than the distance by which the second downspout 34 extends beyond the lower partition plate 32. Under this situation, the bottom opening 332 of the first downspout lies below the liquid level, so that the gas in the washing section 10 can not enter the flash-distilling section 50 through the first downspout 33. The flash-distilling section 50 thus is in gas-phase isolation from the washing section 10. A bottom opening 342 of the second downspout 34 communicates with the washing section 10, so that the cooling liquid accumulated in the lower partition plate 32 can enter the washing section 10 via said second downspout 34. Preferably, the second downspout 34 extends downwards and into the washing section 10 with its bottom opening 342 arranged at a height between the filler segment 13 of the washing section and the gas demister 24 (seeing FIG. 3).

Preferably, a plurality of second downspouts 34 can be provided, wherein distances between their respective top openings 341 and the lower partition plate 32 are different. As shown in FIG. 5, for example, two second downspouts 34 are arranged, wherein the top opening 341a of the left downspout 34a is arranged at a position lower than the top opening 341b of the right downspout 34b. Thus, when the liquid level of the liquid accumulated on the lower partition plate 32 lies between the opening 341a and the opening 341b, the liquid can only enter the washing section 10 through the downspout 34a. When the liquid level rises to exceed the opening 341b, the liquid can enter the washing section 10 through both the downspouts 34a and 34b. That is, the liquid seal means 30 of the invention can automatically adjust the flow rate of the liquid flowing to the washing section 10 depending on the amount of the liquid accumulated on the lower partition plate 32. The more liquid is accumulated, the higher the liquid level is, so that the liquid can flow to the washing section 10 through more second downspouts 34. In contrast, the less liquid is accumulated, the lower the liquid level is, so that the liquid can only flow to the washing section 10 through less second downspouts 34. When the liquid level is lower than top openings of all second downspouts, the liquid seal means 30 stop providing the cooling liquid to the washing section 10. It is appreciated that the number of the second downspouts and the height difference among these second downspouts can be set according to practical requirements.

According to another example of the invention, the liquid seal means 30 may be provided with a control valve for controlling the flow rate of cooling liquid from the flash-distilling section 50 to the washing section 10.

According to an example of the invention, the liquid seal means 30 has a single first downspout 33 arranged at about the center of the cross-section of the tower, and a plurality of second downspouts 34 arranged respectively against the sidewall 101 of the tower. In the case as shown in FIG. 3, the gas demister 24 in the washing section 10 can be placed in a space surrounded by the second downspouts 34 at the top of the washing section 10.

Hereinafter, the operation process of the separating tower of the invention will be described by referring to a particular embodiment.

An exhaust gas of about 85° C. to about 150° C. containing solid dust and moisture such as water enters the tower through the exhaust gas inlet 11 of the washing section 10 under the action of an induced draft fan, and then enters the spraying segment 23 through the exhaust gas dispenser 15. In the spraying segment 23, the exhaust gas is sprayed with the cooling liquid for pre-washing and pre-cooling. Then, the exhaust gas enters the filling unit 17. The cooling liquid which has been cooled by flash-distillation is evenly sprayed into the filling unit 17 by the liquid dispenser 18. In the filling unit 17, there is a gas-liquid contact between the exhaust gas and the cooling liquid proceeds in a counter-flowing manner, so as to perform heat and mass exchange allowing at least a portion and preferably all of the moisture in the exhaust gas to be cooled into liquid and become a portion of the cooling liquid. The exhaust gas after such counter-flowing contact decreases to a temperature of about 20° C. to about 70° C., and is discharged from the tower via the exhaust gas outlet 12 after being demisted through the gas demister 24. In this way, the washing, dehumidifying, and cooling process for the moisture-containing exhaust gas is completed.

The cooling liquid is heated by the exhaust gas to about 40° C. to about 100° C. in the filling unit 17 during the counter-flowing contact, and then falls from the filling unit 17 to the non-condensable gas removing segment 20. After passing through the filler layer 21 to remove the non-condensable gas dissolved in the cooling liquid, the cooling liquid continues to fall and reach the liquid storage segment 14 at the bottom of the tower. A small amount of cooling liquid is discharged quantitatively via the quantitative discharging port 16 through an overflow means at the bottom of the tower or a circulating cooling liquid pump arranged outside the tower and becomes a quantitative discharging liquid, so that the solid dust washed out of the exhaust gas is quantitatively discharged. The remained cooling liquid is fed into an annular space 52 of the flash-distilling section 50 via the cooling liquid inlet 51 by the circulating liquid pump 60 outside the tower.

In the annular space 52, the cooling liquid with temperature of about 40° C. to about 100° C. is flash-distilled under a negative pressure of e.g. 2.5 to 32 kPa(A), thus producing a cooling liquid with temperature of about 20° C. to about 70° C. and a cooling liquid vapor with temperature of about 30° C. to about 70° C. The cooled cooling liquid reaches the washing section 10 through the liquid seal means 30, and continues to participate in the washing, cooling, condensing loop for the exhaust gas. The cooling liquid vapor produced by flash-distillation is demisted by the demister 56, and then leaves the tower 100 via the vapor outlet 53.

FIG. 6 illustrates an exhaust gas separating and recycling system 200 according to an embodiment of the invention, which comprises the exhaust gas separating tower 100 of the invention as described above. The circulating liquid pump 60 is connected between the cooling liquid outlet 15 of the washing section 10 and the cooling liquid inlet 51 of the flash-distilling section 50. The cooling liquid which has washed the exhaust gas in the washing section 10 can be delivered by the pump 60 to the flash-distilling section 50 for flash-distillation. In the example shown in FIG. 6, no quantitative discharging port, but only the cooling liquid outlet 15, is arranged at the bottom of the tower 100. In this case, a branch pipe 61 is connected to an outlet of the pump 60 to quantitatively discharge a predetermined amount of dust-containing cooling liquid through the branch pipe 61, so that the solid dust washed out of the exhaust gas and accumulated in the tower 100 can be quantitatively discharged. Here, the cooling liquid for example can be water.

A condenser 70 is connected to the vapor outlet 53 of the flash-distilling section 50 of the tower, for receiving cooling liquid vapor from the flash-distilling section and condensing the vapor into liquid. The condenser 70 may be air-cooled or water-cooled. The condensed liquid is a clean moisture recycled liquid, which can be delivered to and stored in a storage tank 80 for the use in other processes.

Preferably, an exhaust pump 81 is connected to the top of the storage tank 80, for discharging the non-condensable gas within the storage tank. Preferably, a recycled water pump 82 is connected to a lower part of the storage tank 80, for pumping out the condensed liquid in the storage tank 80 as required and delivering said liquid to other device. For example, the condensed liquid can be delivered to the sprayer 23 of the separating tower 100 which is arranged between the filler segment 13 and the exhaust gas dispenser 19.

Although several preferred embodiments of the present invention have been described, the present invention may be used with other configurations. It will be appreciated by those skilled in the art that, the present invention could have many other embodiments, and changes and modifications may be made thereto without departing from the invention in its broader aspects and as set forth in the following claims and equivalents thereof.

What is claimed is:

1. An exhaust gas separating tower, comprising:
   a washing section configured for washing an exhaust gas entering the tower with a cooling liquid so as to at least partially remove solid dust entrained in the exhaust gas, cool the exhaust gas, and condense at least a portion of moisture in the exhaust gas into liquid, the washing section comprising an exhaust gas inlet, an exhaust gas outlet arranged above the exhaust gas inlet, and a cooling liquid outlet for discharging the cooling liquid having washed the exhaust gas;
   a flash-distilling section arranged above the washing section and configured for flash-distilling the cooling liquid from the washing section to produce a cooled cooling liquid to be provided to the washing section and a cooling liquid vapor, the flash-distilling section comprising a cooling liquid inlet through which the cooling liquid from the washing section enters the flash-distilling section, a flash-distilling space for performing flash-distillation therein, and a vapor outlet through which the cooling liquid vapor is discharged; and
   a liquid seal means arranged between the flash-distilling section and the washing section, so that the cooled cooling liquid produced by flash-distillation is able to enter the washing section through the liquid seal means while the flash-distilling section is in gas-phase isolation from the washing section, wherein a pressure in the flash-distilling section is lower than that in the washing section.

2. The exhaust gas separating tower of claim 1, wherein the liquid seal means comprises:
   an upper partition plate arranged at a bottom of the flash-distilling section;
   a lower partition plate arranged at a top of the washing section and separated from the upper partition plate;
   at least one first downspout extending downwards from the upper partition plate, wherein each first downspout has a top opening arranged in the upper partition plate to communicate with the flash-distilling section, and a bottom opening close to the lower partition plate;
   at least one second downspout extending through the lower partition plate, wherein each second downspout has a top opening arranged at a position higher than the bottom opening of the first downspout, and a bottom opening communicating with the washing section.

3. The exhaust gas separating tower of claim 2, wherein the liquid seal means further comprises a control valve for controlling a flow rate of the cooling liquid from the flash-distilling section to the washing section.

4. The exhaust gas separating tower of claim 2, wherein the liquid seal means comprises a plurality of the second downspouts, wherein distances between the top openings of the respective second downspouts and the lower partition plate are different.

5. The exhaust gas separating tower of claim 4, wherein the first downspout is arranged at about a center of a cross-section of the tower, while the plurality of the second downspouts are respectively arranged against a sidewall of the tower.

6. The exhaust gas separating tower of claim 1, wherein the washing section further comprises:
   a filler segment arranged between the exhaust gas inlet and exhaust gas outlet in a vertical direction, in which the cooling liquid from the flash-distilling section and the exhaust gas input via the exhaust gas inlet contact with each other in a counter-flowing manner; and
   a liquid storage segment arranged at a bottom of the tower for storing the cooling liquid falling from the filler segment,
   wherein the cooling liquid outlet is arranged at a bottom wall of the tower, via which the cooling liquid in the liquid storage segment is dischargeable.

7. The exhaust gas separating tower of claim 6, wherein the filler segment comprises at least one filling unit having one or more layers of fillers and at least one liquid dispenser, wherein above each filling unit there is one liquid dispenser.

8. The exhaust gas separating tower of claim 7, wherein each layer of the filler is selected from a bulk filler, a regular filler, a general sieve plate, an oriented sieve plate, and/or a multiple-downspout sieve plate.

9. The exhaust gas separating tower of claim 6, wherein the washing section further comprises a non-condensable gas removing segment arranged between the filler segment and the liquid storage segment, the non-condensable gas removing segment comprising:
   a filler layer, and
   a vapor inlet pipe extending from the sidewall of the tower to the filler layer, via which a vapor can enter the filler layer so as to heat the cooling liquid passing through the filler layer, allowing the non-condensable gas in the cooling liquid volatilize therefrom.

10. The exhaust gas separating tower of claim 6, wherein the washing section further comprises an exhaust gas dispenser arranged below the filler segment, through which the exhaust gas input through the exhaust gas inlet is able to be evenly provided to the filler segment.

11. The exhaust gas separating tower of claim 10, wherein the washing section further comprises a spraying segment arranged between the filler segment and the exhaust gas dispenser, for pre-cooling and pre-washing the exhaust gas before the exhaust gas reaches the filler segment.

12. The exhaust gas separating tower of claim 6, wherein the washing section further comprises a gas demister arranged between the filler segment and the exhaust gas outlet, for removing mist droplets from the exhaust gas before said exhaust gas being discharged via the exhaust gas outlet, wherein a opening of the liquid seal means to the washing section is arranged at a height between the filler segment and the gas demister.

13. The exhaust gas separating tower of claim 6, wherein the washing section comprises a quantitative discharging port branching from the cooling liquid outlet, through which the cooling liquid in the liquid storage segment is quantitatively discharged to maintain solid dust content in the separating tower within a predetermined range.

14. The exhaust gas separating tower of claim 1, wherein the cooling liquid inlet of the flash-distilling section is arranged in the sidewall of the tower and above the flash-distilling space;
wherein the flash-distilling section further comprises a cooling liquid dispenser arranged between the cooling liquid inlet and the flash-distilling space, for evenly distributing the cooling liquid input from the cooling liquid inlet into the below flash-distilling space.

15. The exhaust gas separating tower of claim 14, wherein the vapor outlet of the flash-distilling section is arranged at the top of the tower, the flash-distilling section further comprising a demister for removing mist droplets in the cooling liquid vapor produced by flash-distillation before the cooling liquid vapor being discharged from the flash-distilling section, wherein the demister is arranged below the vapor outlet and above the cooling liquid inlet.

16. The exhaust gas separating tower of claim 1, wherein the pressure in the washing section is at an atmospheric pressure, while the pressure in the flash-distilling section is about 2.5 kPa(A) to about 32 kPa(A).

17. An exhaust gas separating and recycling system, comprising:
an exhaust gas separating tower, which comprises:
a washing section configured for washing an exhaust gas entering the tower with a cooling liquid so as to at least partially remove solid dust entrained in the exhaust gas, cool the exhaust gas, and condense at least a portion of moisture in the exhaust gas into liquid, the washing section comprising an exhaust gas inlet, an exhaust gas outlet above the exhaust gas inlet, and a cooling liquid outlet for discharging the cooling liquid having washed the exhaust gas;
a flash-distilling section arranged above the washing section and configured for flash-distilling the cooling liquid from the washing section to produce a cooled cooling liquid to be provided to the washing section and a cooling liquid vapor, the flash-distilling section comprising a cooling liquid inlet through which the cooling liquid from the washing section enters the flash-distilling section, a flash-distilling space for performing flash distillation therein, and a vapor outlet through which the cooling liquid vapor is discharged; and
a liquid seal means arranged between the flash-distilling section and the washing section, so that the cooling liquid produced by flash-distillation is able to enter the washing section through the liquid seal means while the flash-distilling section is in gas-phase isolation from the washing section, wherein a pressure in the flash-distilling section is lower than that in the washing section; and
a pump connected between the cooling liquid outlet of the washing section and the cooling liquid inlet of the flash-distilling section, for delivering the cooling liquid that has washed the exhaust gas from the washing section into the flash-distilling section for flash-distillation.

18. The system of claim 17, wherein the liquid seal means comprises:
an upper partition plate arranged at the bottom of the flash-distilling section;
a lower partition plate arranged at the top of the washing section and separated from the upper partition plate;
at least one first downspout extending downwards from the upper partition plate, wherein each first downspout has a top opening arranged in the upper partition plate to communicate with the flash-distilling section, and a bottom opening close to the lower partition plate;
at least one second downspout extending through the lower partition plate, wherein each second downspout has a top opening arranged at a position higher than the bottom opening of the first downspout, and has a bottom opening communicating with the washing section.

19. The system of claim 17, further comprising:
a condenser, connected to the vapor outlet of the flash-distilling section, for receiving the cooling liquid vapor from the flash-distilling section, and condensing said vapor into liquid; and
a storage tank, for storing the condensed liquid from the condenser.

20. The system of claim 17, further comprising:
an exhaust pump connected to the top of the storage tank, for discharging the non-condensable gas within the storage tank; and
a recycled water pump connected to a lower part of the storage tank, for pumping out the condensed liquid in the storage tank.

* * * * *